United States Patent [19]

Mechoulam et al.

[11] 3,869,475
[45] Mar. 4, 1975

[54] 2,6-METHANO-BENZOXACIN COMPOUNDS

[75] Inventors: Raphael Mechoulam, Jerusalem; Shlomo Houry, Ramat-Gan, both of Israel; Bernard Loev, Broomall, Pa.

[73] Assignees: Yissum Research Development Company, Jerusalem, Israel; by said Mechoulam and Houry; SmithKline Corporation, Philadelphia, Pa. ; by said Loev

[22] Filed: Oct. 11, 1973

[21] Appl. No.: 405,343

Related U.S. Application Data

[63] Continuation-in-part of Ser. No. 348,421, April 5, 1973, abandoned.

[52] U.S. Cl. .............................. 260/345.2, 424/283
[51] Int. Cl. .............................................. C07d 7/20
[58] Field of Search .................................. 260/345.2

[56] References Cited
OTHER PUBLICATIONS

Ganoi et al., *Israel J. Chem.*, 6, pp. 679–690, (1968).
Gardillo et al., *Tetrahedron Letters*, No. 10, pp. 945–948, (1972).

*Primary Examiner*—John M. Ford
*Attorney, Agent, or Firm*—Joan S. Keps; Richard D. Foggio; William H. Edgerton

[57] ABSTRACT

The compounds are 2,6-methano-benzoxacins having pharmacological activity such as central nervous system activity and gastric acid secretion inhibitory activity. In addition, certain of the compounds, i.e., 2,6-methano-benzoxacin-4-ones, are useful as intermediates.

6 Claims, No Drawings

2,6-METHANO-BENZOXACIN COMPOUNDS

This application is a continuation-in-part of Ser. No. 348,421, filed Apr. 5, 1973 now abandoned.

This invention relates to new 2,6-methanobenzoxacin compounds having pharmacological activity. In addition, certain of these compounds are useful as intermediates.

The compounds of this invention are represented by the following formula:

FORMULA I

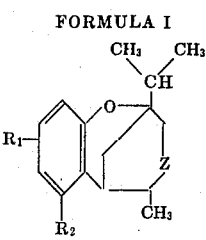

in which:

one of $R_1$ and $R_2$ is hydroxy and the other is straight or branched alkyl having 5 to 12 carbon atoms and Z is

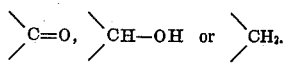

Preferred compounds of this invention are represented by Formula I in which $R_1$ is 1,2-dimethylheptyl or pentyl and $R_2$ is hydroxy. In addition, preferably, Z is

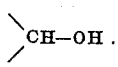

The compounds of Formula I may exist as stereoisomers. The C-5 methyl group in the oxacin ring may have the axial or equatorial configuration. Also, the compounds of Formula I may exist as optical isomers due to asymmetry of carbon atoms. The formulas presented herein are intended to include all of the isomers, including separated isomers and mixtures thereof.

The compounds of this invention are prepared by the following procedures:

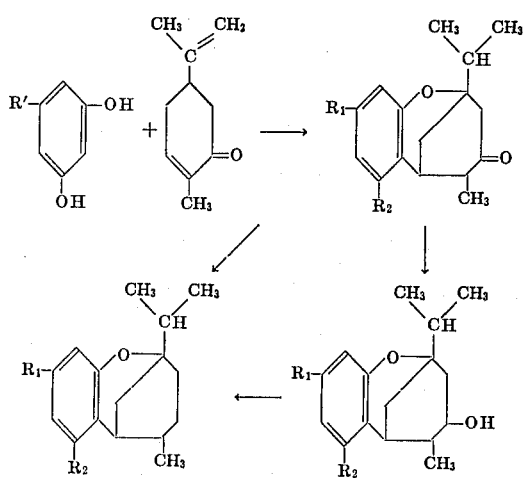

The terms $R_1$ and $R_2$ are defined above and $R'$ is straight or branched alkyl having 5 to 12 carbon atoms.

According to the above procedure, carvone is condensed with a 5-alkylresorcinol in the presence of a strong acid, such as phosphorus oxychloride, surfuric acid or hydrochloric acid, to give the benzoxacin-4-ones of this invention. Reduction of the keto group by standard procedures for the reduction of ketones to alcohols, for example with a metallic hydride such as lithium aluminum hydride in an ether solvent or by catalytic hydrogenation, gives the benzoxacin-4-ols of this invention. The deoxy compounds of this invention, i.e., the compounds of Formula I in which Z is

are prepared by reaction of the benzoxacin-4-ones with 1,2-ethanedithiol in the presence of acid to give the thioketal and then reductive desulfurization of the thioketals, for example using Raney nickel, or by converting the keto group to hydrazone and then treating the hydrazone with strong base. Also, the deoxy compounds may be prepared by dehydration of the benzoxacin-4-ols followed by catalytic reduction.

In addition, the compounds of Formula I in which Z is

and $R_1$ is alkyl and $R_2$ is hydroxy may be obtained by reacting α-pinene or limonene with a 5-alkylresorcinol in the presence of a strong acid such as phosphorus oxychloride, sulfuric acid or hydrochloric acid.

The compounds of this invention have pharmacological activity such as central nervous system activity, for example the compounds have central nervous system depressant, sedative and tranquilizing activity. In addition, the compounds may have analgesic, hypotensive, anticonvulsive and antimigraine activity. Also, certain of the compounds, in particular, where one of $R_1$ and $R_2$ is 1,2-dimethylheptyl and the other is hydroxy, have gastric acid secretion inhibitory activity.

The central nervous system activity is demonstrated by oral administration to rats at doses of about 10 to about 200 mg./kg. to produce effects such as decreased spontaneous motor activity.

The inhibition of gastric acid secretion is demonstrated by administration to chronic gastric fistula rats (Brodie et al., *Amer. J. Physiol.* 202:812–814, 1962) at doses of about 2 to about 50 mg./kg. orally. In this procedure, compounds which produce an increase in the gastric pH or decrease in the volume of gastric juice or both are considered active.

One skilled in the art will recognize that in determining the amounts of the compound to produce the desired pharmacological effect, the activity of the compound as well as the size of the host animal must be considered.

The compounds of this invention may be combined with standard pharmaceutical carriers and administered internally in conventional dosage forms such as capsules, tablets or liquid preparations.

In addition, the compounds of Formula I in which Z is

are useful as intermediates for the corresponding compounds in which Z is

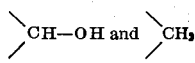

as described hereabove.

The following examples are not limiting but are illustrative of the compounds of this invention and processes for their preparation.

EXAMPLE 1

Carvone (1.4 g.) in 5 ml. of benzene is mixed with 1.4 g. of olivetol (5-pentylresorcinol) and 0.5 g. of phosphorus oxychloride. The solution is boiled for two hours. The reaction mixture is cooled and a saturated aqueous solution of sodium bicarbonate (50 ml.), followed by ether (50 ml.) is added. The organic layer is washed with a saturated aqueous solution of sodium chloride, dried over magnesium sulfate and evaporated. The residue is dissolved in 10 ml. of petroleum ether — ether (10:1) and chromatographed over 125 g. of silica gel. Fractions of 150 ml. are collected. Fractions with similar composition are combined. The following compounds are obtained: 5,6-dihydro-7-hydroxy-2-isopropyl-5-methyl-9-pentyl-2,6-methano-2H-1-benzoxacin-4(3H)-one (C-5 methyl equatorial), eluted with petroleum ether containing 6% ether; and a mixture of 5,6-dihydro-7-hydroxy-2-isopropyl-5-methyl-9-pentyl-2,6-methano-2H-1-benzoxacin-4(3H)-one (C-5 methyl axial) and 5,6-dihydro-9-hydroxy-2-isopropyl-5-methyl-7-pentyl-2,6-methano-2H-1-benzoxacin-4(3H)-one, eluted with petroleum ether containing 8% ether.

5,6-Dihydro-7-hydroxy-2-isopropyl-5-methyl-9-pentyl-2,6-methano-2H-1-benzoxacin-4(3H)-one (C-5 methyl equatorial) after crystallization from ether-petroleum ether melts at 161°C.

The mixture of benzoxacin-4(3H)-ones prepared above is separated by a further chromatography on 25 g. of silica gel. Elution with petroleum ether containing 5% ether gives first 5,6-dihydro-7-hydroxy-2-isopropyl-5-methyl-9-pentyl-2,6-methano-2H-1-benzoxacin-4(3H)-one (C-5 methyl axial), m.p. 166–167°C. Further elution with the same solvent gives 5,6-dihydro-9-hydroxy-2-isopropyl-5-methyl-7-pentyl-2,6-methano-2H-1-benzoxacin-4(3H)-one, m.p. 108–109°C.

EXAMPLE 2

5,6-Dihydro-7-hydroxy-2-isopropyl-5-methyl-9-pentyl-2,6-methano-2H-1-benzoxacin-4(3H)-one (C-5 methyl equatorial), 2.1 g., dissolved in 20 ml. of dry ether is dropped into a suspension of 3 g. of lithium aluminum hydride in 100 ml. of ether over 45 minutes. The mixture is boiled for 24 hours, then cooled with ice; a saturated aqueous solution of sodium sulfate is added slowly. The mixture is then acidified with hydrochloric acid (1:1) and extracted with ether (3 times, 100 ml.). The organic phase is washed with a saturated aqueous solution of sodium chloride, dried over magnesium sulfate and evaporated to give a solid which is purified by column chromatography (silica gel, 82 g.). Elution with ether-petroleum ether (15:85) gives 5,6-dihydro-7-hydroxy-2-isopropyl-5-methyl-9-pentyl-2,6-methano-2H-1-benzoxacin-4(3H)-ol (C-5 methyl equatorial), m.p. 169–170°C. (ether-petroleum ether).

EXAMPLE 3

By the procedure of Example 2, 5,6-dihydro-7-hydroxy-2-isopropyl-5-methyl-9-pentyl-2,6-methano-2H-1-benzoxacin-4(3H)-one (C-5 methyl axial) is reduced to give 5,6-dihydro-7-hydroxy-2-isopropyl-5-methyl-9-pentyl-2,6-methano-2H-1-benzoxacin-4(3H)-ol (C-5 methyl axial), m.p. 156–157°C. (ether-petroleum ether).

EXAMPLE 4

By the procedure of Example 2, 5,6-dihydro-9-hydroxy-2-isopropyl-5-methyl-7-pentyl-2,6-methano-2H-1-benzoxacin-4(3H)-one is reduced to give 5,6-dihydro-9-hydroxy-2-isopropyl-5-methyl-7-pentyl-2,6-methano-2H-1-benzoxacin-4(3H)-ol, m.p. 174°–175°C. (ether-petroleum ether).

EXAMPLE 5

5,6-Dihydro-7-2-isopropyl-5-methyl-9-pentyl-2,6-methano-2H-1-benzoxacin-4(3H)-one (C-5 methyl equatorial), 1.4 g., is dissolved in 5 ml. of benzene. 1,2-Ethanedithiol (0.3 ml.) and 0.7 g. of zinc chloride are added and the mixture is boiled for 26 hours. Ice is added followed by a few drops of concentrated hydrochloric acid in acetone. The gelatinous mixture is extracted with ether (3 times, 100 ml.), then with chloroform (3 times, 100 ml.). The organic solution is washed with a saturated aqueous sodium chloride solution, dried over magnesium sulfate and evaporated. The residue is dissolved in 100 ml. methanol, 30 g. of Raney nickel (in methanol) is added and the mixture is boiled with stirring for 24 hours. The suspension is filtered and the insoluble material is then washed with methanol and ether. The combined filtrates are concentrated and purified by thin layer chromatography to give 3,4,5,6-tetrahydro-7-hydroxy-2-isopropyl-5-methyl-9-pentyl-2,6-methano-2H-1-benzoxacin (C-5 methyl equatorial).

EXAMPLE 6

By the procedure of Example 5, 5,6-dihydro-7-hydroxy-2-isopropyl-5-methyl-9-pentyl-2,6-methano-2H-1-benzoxacin-4(3H)-one (C-5 methyl axial) is converted to the corresponding deoxy compound, 3,4,5,6-tetrahydro-7-hydroxy-2-isopropyl-5-methyl-9-pentyl-2,6-methano-2H-1-benzoxacin (C-5 methyl axial).

EXAMPLE 7

5,6-Dihydro-9-hydroxy-2-isopropyl-5-methyl-7-pentyl-2,6-methano-2H-1-benzoxacin-4(3H)-one is converted to the thioketal and the thioketal is treated with Raney nickel by the procedure of Example 5 to give 3,4,5,6-tetrahydro-9-hydroxy-2-isopropyl-5-methyl-7-pentyl-2,6-methano-2H-1-benzoxacin.

EXAMPLE 8

Carvone (2.8 g.) in 5 ml. of benzene is mixed with 4.0 g. of 5-(1,2-dimethylheptyl)resorcinol and 1.0 g. of phosphorus oxychloride. The mixture is boiled for two hours, then cooled and a saturated aqueous solution of sodium bicarbonate (100 ml.) followed by ether (100 ml.) is added. The organic layer is washed with a saturated aqueous solution of sodium chloride, dried over magnesium sulfate and evaporated. The residue is dissolved in 20 ml. of petroleum ether-ether (10:1) and chromatographed over 300 g. of silica gel. Fractions of 150 ml. are collected. Fractions with similar composition are combined. Elution with ether-petroleum ether gives 9-(1,2-dimethylheptyl)-5,6-dihydro-7-hydroxy-2-isopropyl-5-methyl-2,6-methano-2H-1-benzoxacin-4(3H)-one (C-5 methyl equatorial), 9-(1,2-dimethylheptyl)-5,6-dihydro-7-hydroxy-2-isopropyl-5-methyl-2,6-methano-2H-1-benzoxacin-4-3H)-one (C-5 methyl axial), m.p. 134°C., and 7-(1,2-dimethylheptyl)-5,6-dihydro-9-hydroxy-2-isopropyl-5-2,6-methano-2H-1-benzoxacin-4(3H)-one.

EXAMPLE 9

9-(1,2-Dimethylheptyl)-5,6-dihydro-7-hydroxy-2-isopropyl-5-methyl-2,6-methano-2H-1-benzoxacin-4(3H)-one (C-5 methyl equatorial), 2.1 g., dissolved in 300 ml. of dry ether is dropped into a suspension of 4.0 g. of lithium aluminum hydride in 700 ml. of ether over 45 minutes and is boiled for another 24 hours. The reaction mixture is cooled with ice and a saturated aqueous solution of sodium sulfate is added slowly. The solution is acidified with hydrochloric acid (1:1) and extracted with ether (3 times, 100 ml.). The organic phase is washed with a saturated aqueous solution of sodium chloride, dried over magnesium sulfate, and evaporated to give a solid The solid is purified by column chromatography (silica gel. 82 g.). Elution with ether-petroleum ether (15:85) gives 9-(1,2-dimethylheptyl)-5,6-dihydro-7-hydroxy-2-isopropyl-5-methyl-2,6-methano-2H-1-benzoxacin-4(3H)-ol (C-5 methyl equatorial).

EXAMPLE 10

9-(1,2-Dimethylheptyl)-5,6-dihydro-7-hydroxy-2-isopropyl-5-methyl-2,6-methano-2H-1-benzoxacin-4(3H)-one (C-5 methyl axial), 2.1 g. is reduced with lithium aluminum hydride in ether to give 9-(1,2-dimethlheptyl)-5,6-dihydro-7-hydroxy-2-isopropyl-5-methyl-2,6-methano-2H-1-benzoxacin-4(3H)-ol (C-5 methyl axial), m.p. 134°C. (ether petroleum ether).

Similarly, 7-(1,2-dimethylheptyl)-5,6-dihydro-9-hydroxy-2-isopropyl-5-methyl-2,6-methano-2H-1-benzoxacin-4(3H)-one is reduced to give the corresponding benzoxacin-4(3H)-ol.

EXAMPLE 11

By the procedure of Example 5, the benzoxacin-4-ones prepared as in Example 8, are converted to the thioketals and then treated with Raney nickel to give the following benzoxacin compounds:
9-(1,2-dimethylheptyl)-3,4,5,6-tetrahydro-7-hydroxy-2-isopropyl-5-methyl-2,6-methano-2H-1-benzoxacin (C-methyl axial)
9-(1,2-dimethylheptyl)-3,4,5,6-tetrahydro-7-hydroxy-2-isopropyl-5-methyl-2,6-methano-2H-1-benzoxacin (C-5 methyl equatorial)
7-(1,2-dimethylheptyl)-3,4,5,6-tetrahydro-9-hydroxy-2-isopropyl-5-methyl-2,6-methano-2H-1-benzoxacin.

EXAMPLE 12

In the procedure of Example 8, using the following 5-alkylresorcinols in place of 5-(1,2-dimethylheptyl)-resorcinol:
5-(1,2-dimethyloctyl)resorcinol
5-(1,2-dimethylhexyl)resorcinol
5-(1,1-dimethylheptyl)resorcinol
5-(1-ethyl-2-methylpropyl)resorcinol
5-(1-methylnonyl)reorcinol
5-(1-methyloctyl)resorcinol
5-(1,2,4-trimethylhexyl)resorcinol
5-(1-ethylheptyl)resorcinol
the corresponding 9-alkyl-7-hydroxy and 7-alkyl-9-hydroxy benzoxacin-4(3H)-ones are obtained.

By the procedures of Examples 9 and 11, these benzoxacin-4-ones are reduced to the corresponding benzoxacin-4-ols and 3,4,5,6-tetrahydrobenzoxacins.

EXAMPLE 13

3,5-Dimethoxyphenyl-α-methylacetonitrile is converted to 3,5-dimethoxy-α-methylbenzyl methyl ketone by refluxing with methyl magnesium bromide in ether, then pouring the reaction mixture onto an ice water-hydrochloric acid mixture and working up by standard procedures. This ketone is then reacted with n-octyl magnesium bromide and the resulting 1,3-dimethoxy-5-(2-hydroxy-1,2-dimethyl-decyl)benzene is dehydrated and reduced and the methoxy groups are demethylated to give 5-(1,2-dimethyldecyl)-resorcinol.

Using 5-(1,2-dimethyldecyl)resorcinol in place of 5-(1,2-dimethylheptyl)resorcinol in the procedure of Example 8 gives the following benzoxacin-4-ones:
9-(1,2-dimethyldecyl)-5,6-dihydro-7-hydroxy-2-isopropyl-5-methyl-2,6-methano-2H-1-benzoxacin-4(3H)-one
7-(1,2-dimethyldecyl)-5,6-dihydro-9-hydroxy-2-isopropyl-5-methyl-2,6- methano-2H-1-benzoxacin-4(3H)-one.

By the procedures of Examples 9 and 11, these benzoxacin-4-ones are reduced to the corresponding benzoxacin-4-ols and 3,4,5,6-tetrahydrobenzoxacins.

EXAMPLE 14

By the procedure of Example 1, using 5-heptylresorcinol in place of 5-pentylresorcinol, the following products are obtained:
9-heptyl-5,6-dihydro-7-hydroxy-2-isopropyl-5-methyl-2,6-methano-2H-1-benzoxacin-4(3H)-one (C-5 methyl axial)
9-heptyl-5,6-dihydro-7-hydroxy-2-isopropyl-5-methyl-2,6-methano-2H-1-benzoxacin-4(3H)-one (C-5 methyl equatorial)
7-heptyl-5,6-dihydro-9-hydroxy-2-isopropyl-5-methyl-2,6-methano-2H-1-benzoxacin-4(3H)-one.

Reducing the benzoxacin-4-ones, prepared as described above, with lithium aluminum hydride in ether by the procedure of Example 2 gives the corresponding benxzoxacin-4-ols.

By the procedure of Example 5, the benzoxacin-4-ones, prepared as described above, are converted to the thioketals and the thioketals are treated with Raney nickel to give the corresponding 3,4,5,6-tetrahydrobenzoxacins.

EXAMPLE 15

α-Pinene (0.7 g.) and 0.9 g. of olivetol (5-pentylresorcinol) are dissolved in 5 ml. of benzene. Phosphorus oxychloride (0.3 g.) is added and the solution is boiled for two hours. The cooled solution is neutralized with aqueous sodium bicarbonate solution (50 ml.) and extracted with ether. The etheric solution is chromatographed over silica gel (75 g.). Elution with petroleum ether containing 12% ether gives 3,4,5,6-tetrahydro-7-hydroxy-2-isopropyl-5-methyl-9-pentyl- 2,6-methano-2H-1-benzoxacin. Further purification is carried out by thin layer chromatography.

EXAMPLE 16

Using limonene in place of α-pinene in the procedure of Example 15, 3,4,5,6-tetrahydro-7-hydroxy-2-isopropyl-5-methyl-9-pentyl-2,6-methano-2H-1-benzoxacin is obtained.

What is claimed is:

1. A compound of the formula:

FORMULA I

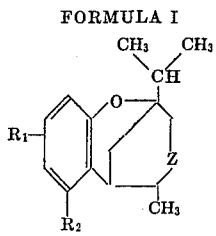

in which:

one of $R_1$ and $R_2$ is hydroxy and the other is straight or branched alkyl having 5 to 12 carbon atoms and

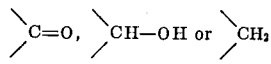

2. A compound of claim 1 in which Z is

or 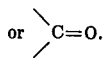

3. A compound of claim 1 in which $R_1$ is 1,2-dimethylheptyl and $R_2$ is hydroxy.

4. A compound of claim 1 in which $R_1$ is pentyl and $R_2$ is hydroxy.

5. A compound of claim 1 in which Z is

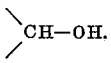

6. A compound of claim 1 in which Z is

* * * * *

UNITED STATES PATENT OFFICE
CERTIFICATE OF CORRECTION

PATENT NO. : 3,869,475
DATED : March 4, 1975
INVENTOR(S) : Raphael Mechoulam, Shlomo Houry and Bernard Loev It is certified that error appears in the above-identified patent and that said Letters Patent are hereby corrected as shown below:

Column 4, line 20, " 7-2- " should read   7-hydroxy-2-   .

Column 5, line 7, " -4-3H)- " should read   -4(3H)-   .

Column 5, at the end of line 9, after " -5- " insert methyl-   .

Column 6, line 51, " benxzoxacin- " should read   benzoxacin-   .

Column 7, line 25, before 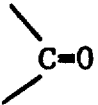 insert   Z is   .

Signed and sealed this 13th day of May 1975.

(SEAL)
Attest:

RUTH C. MASON
Attesting Officer

C. MARSHALL DANN
Commissioner of Patents
and Trademarks